US011294688B2

(12) United States Patent
Krayden et al.

(10) Patent No.: US 11,294,688 B2
(45) Date of Patent: Apr. 5, 2022

(54) PARALLEL INFORMATION PROCESSING ON MULTI-CORE COMPUTING PLATFORMS

(71) Applicants: DRIVENETS LTD., Raanana (IL); AT&T SERVICES, INC., Dallas, TX (US)

(72) Inventors: Amir Krayden, Even Yehuda (IL); Yuval Moshe, Tirat Carmel (IL); Anton Gartsbein, Kiryat Tivon (IL); Gal Zolkover, Haifa (IL); Or Sadeh, Tel Aviv (IL); Ori Zakin, Sde Varburg (IL); Yuval Lev, Gan Yavne (IL)

(73) Assignees: DRIVENETS LTD., Raanana (IL); AT&T SERVICES, INC., Dallas, TX (US)

( * ) Notice: Subject to any disclaimer, the term of this patent is extended or adjusted under 35 U.S.C. 154(b) by 13 days.

(21) Appl. No.: 16/622,482

(22) PCT Filed: Jun. 1, 2018

(86) PCT No.: PCT/IL2018/050596
§ 371 (c)(1),
(2) Date: Dec. 13, 2019

(87) PCT Pub. No.: WO2018/229745
PCT Pub. Date: Dec. 20, 2018

(65) Prior Publication Data
US 2020/0142708 A1 May 7, 2020

Related U.S. Application Data

(60) Provisional application No. 62/520,624, filed on Jun. 16, 2017.

(51) Int. Cl.
*G06F 9/38* (2018.01)
*G06F 9/50* (2006.01)

(52) U.S. Cl.
CPC .......... *G06F 9/3885* (2013.01); *G06F 9/3867* (2013.01); *G06F 9/5066* (2013.01)

(58) Field of Classification Search
CPC .... G06F 9/3885; G06F 9/3887; G06F 9/3867; G06F 9/52; G06F 15/7825; G06F 9/5066; H04L 49/3063; H04L 49/1546
See application file for complete search history.

(56) References Cited

U.S. PATENT DOCUMENTS 8,694,994 B1 * 4/2014 Vincent ..................... G06F 9/38
718/1
2005/0138622 A1 6/2005 McAlpine et al.
(Continued)

FOREIGN PATENT DOCUMENTS

CN 106100991 A 11/2016

OTHER PUBLICATIONS

Scott Raynovich, "What Is Network Service Chaining? Definition", Feb. 11, https://www.sdxcentral.com/networking/virtualization/definitions/what-is-network-service-chaining/ (Year: 2016).*

*Primary Examiner* — Courtney P Carmichael-Moody
(74) *Attorney, Agent, or Firm* — Browdy and Neimark, PLLC

(57) ABSTRACT

A parallel-processing computer system is provided for parallel processing of data packets conveyed in a communication network. The system comprises: a memory; a plurality of processing elements; and a program stored at the memory for execution by the plurality of processing elements. The at least one program comprises instructions for: receiving one or more data packets comprising operational instructions from an application; establishing a pipeline element for carrying out a service process, which comprises a plurality of sub-pipelines, each associated with a respective task required for carrying out the service process and wherein each of the plurality of processing elements is operative for (Continued)

carrying out tasks associated with a respective sub-pipeline belonging to the plurality of sub-pipelines; and executing simultaneously by the plurality of processing elements, tasks associated with the plurality of sub-pipelines, wherein the plurality of processing elements is implementing a parallel processing of each data packet.

4 Claims, 3 Drawing Sheets

(56) References Cited

U.S. PATENT DOCUMENTS

| | | | |
|---|---|---|---|
| 2006/0212456 A1* | 9/2006 | Earhart | G06F 9/526 |
| 2010/0302261 A1 | 12/2010 | Abdo et al. | |
| 2014/0281385 A1* | 9/2014 | Tu | G06F 9/3885 |
| | | | 712/43 |
| 2014/0281386 A1 | 9/2014 | Fox et al. | |
| 2016/0044695 A1 | 2/2016 | Gunner | |
| 2016/0182684 A1* | 6/2016 | Connor | G06F 9/45558 |
| | | | 709/203 |
| 2016/0226759 A1* | 8/2016 | Zhang | H04L 41/0654 |
| 2017/0010925 A1* | 1/2017 | Hopkins | G06F 9/52 |
| 2018/0260255 A1* | 9/2018 | Yazdani | G06F 9/524 |

\* cited by examiner

PARALLEL INFORMATION PROCESSING ON MULTI-CORE COMPUTING PLATFORMS

TECHNICAL FIELD

The present disclosure relates generally to the field of parallel computing, and in particular, to systems and methods for high-performance computing on a parallel-processing computer system including multiple processing elements.

BACKGROUND

In order to achieve high scale and throughput capabilities for information processing in general and packet processing specifically, the solutions that have been long been adopted and implemented, are solutions that rely on dedicated hardware devices (Application Specific Integrated Circuits, aka ASICs). ASICs are integrated circuits customized for a particular use, rather than intended for general-purpose use. As feature sizes have shrunk and design tools improved over the years, the maximum complexity (and hence functionality) possible in an ASIC has grown from 5,000 gates to over 100 million. Modern ASICs often include entire microprocessors, memory blocks including ROM, RAM, EEPROM, flash memory and other large building blocks. Such ASICs are often termed a SoC (System-on-Chip).

Yet, the use of ASICs suffers from two major drawbacks:
1. They are very expensive to develop. It may take 2-4 years to develop such an ASOC at a cost of $100M-$300M; and
2. They allow very little flexibility (functions are "hard coded", thus giving little room for new functionalities).

These drawbacks have led to several constrains in the networking industry:
1) Only very few companies could have dedicated the required sums of money to become players in the market, consequently, the small number of players has driven the price of the equipment up even further; and
2) Network functionality evolved much slower than the requirements due to the period of time required to implement changes in the networking platforms based on ASIC devices.

In order to overcome these obstacles, the use of network processing units (NPUs), also known as network processors, has started to gain popularity. A network processor (NPU) is an integrated circuit that is a programmable software device used as a network architecture component within a network application domain. A network processor in a network is analogous to a central processing unit in a computer or a similar device. The replacement of analogous signals to packet data form in the telecommunication field, has led to integrated circuits of network processors that handle data packets.

Modern-day network processors have developed from simple designs to complex ICs with programmable software and a variety of operations and manipulation functions on the data packet. Network processors are employed in routers, network switches, packet inspection, session controllers, firewalls, transmitter devices, error detection and prevention devices and network control software. With today's web networking growing stronger than ever, network processors play a significant role in managing an overloaded network with abundant traffic and rapid growth rate. Network processors play a key role in packet inspection, encryption, monitoring, traffic management and queue management in large networks.

Yet, even this solution, which allows certain degree of flexibility, requires the use of relatively expensive devices and still does not provide the flexibility and agility required by the market.

SUMMARY

The disclosure may be summarized by referring to the appended claims.

It is an object of the present disclosure to provide a system and a method for improving performance of data processing.

It is another object of the disclosure to provide a system and a method adapted to perform processing tasks while making use of only a single pipeline, and consequently enabling the reduction of software queues while maintaining software locks at a minimum level for all services.

It is another object of the disclosure to provide a system and a method that enable achieving an improved performance of a service chain per a CPU core.

It is another object of the disclosure to provide a system and a method that do not require copying packets and having them replaced in the memory, as every process requiring an access to a packet is allowed to access the very same copy of the packet as the other processes requiring an access to that packet.

It is another object of the disclosure vide to provide a system and a method that require less memory transactions to be carried out.

It is another object of the disclosure to provide a system and a method that enable processes to access the same packet in parallel, without having to wait for another process to complete processing that packet.

It is another object of the disclosure to provide a system and a method wherein IU/O requirements of the processor are reduced to a single transaction.

It is another object of the disclosure to provide a system and a method which implement service chaining natively, without the need to cycle packets back and forth.

Other objects of the present disclosure will become apparent from the following description.

According to a first embodiment of the present disclosure, there is provided a parallel-processing computer system for parallel processing of data packets conveyed in a communication network, comprising:
 a memory;
 a plurality of processing elements; and
 at least one program stored at the memory configured to be executed by the plurality of processing elements, and wherein the at least one program comprises instructions for:
  at run-time, while the application is being executed,
  receiving one or more data packets comprising operational instructions from an application;
  establishing a pipeline element for carrying out a service process, wherein the pipeline element comprises a plurality of sub-pipelines, each associated with a respective task or a part thereof, required for carrying out that service process, wherein each of the plurality of processing elements is operative to carry out one or more tasks associated with a respective sub-pipeline belonging to the plurality of sub-pipelines included in the pipeline element;
  executing simultaneously by the plurality of processing elements tasks that are associated with the plurality of sub-pipelines, wherein the plurality of processing elements is implementing a parallel processing of each data packet, for carrying out the service process.

The term "processing element" as used herein throughout the specification and claims should be understood to encompass single-core central processing units, multi-core central processing units, graphics processing units, single-core co-processors, multi-core co-processors, and the like.

The term "pipeline element" as used herein throughout the specification and claims is used to denote a set of data processing elements connected in series (where the output of one element is the input of the next one). The elements of a pipeline may be executed in parallel or in a time-sliced fashion, where some amount of buffer storage may be applied between elements.

The term "thread" as used herein throughout the specification and claims is used to denote the smallest sequence of programmed instructions that can be managed independently by a scheduler, and which is typically a part of the operating system.

The term "lockless access" as used herein is used to denote a reading and writing access to a buffer without using a locking mechanism, thereby avoiding any delays attendant to using a locking mechanism when performing reading operations to provide the reader with data from the buffer.

According to another embodiment, the service process is carried out by chaining functions executed by the same processing element.

According to still another embodiment, the selected processing element is configured to forward packets from one sub-pipeline to another sub-pipeline by calling an in-function associated with the other sub-pipeline.

In accordance with another embodiment, at least one task but less than all tasks associated with a respective pipeline element, is/are divided between a number of processing elements.

By yet another embodiment, the parallel-processing computer system further comprises a multiple updating lockless timer, configured to update timers by applying information received from a plurality of threads.

According to another embodiment, the parallel-processing computer system further comprises a processor configured to determine a flow of objects between queues in accordance with their timers, while a plurality of threads is used to update the objects' last accessed times.

In accordance with another embodiment, the processor is configured to divert an object emerging from a timer queue, to a queue which is closest to its expiration timeout when compared with other queues comprised in the parallel-processing computer system.

By still another embodiment, each object is provided with access times, determined according to: a) number of its associated data writing means that would allow lockless access, and b) the time at which it has entered a queue, thereby enabling the processor to determine which one or more objects should be removed from their respective queues.

According to another embodiment, the parallel-processing computer system comprises a single data writer and a plurality of data readers, configured to enable a single managing entity to update data elements in a respective lookup table, and to read that updated lookup table for a plurality of real-time threads.

In accordance with another aspect of the disclosure, there is provided a method for carrying out parallel processing of data packets conveyed in a communication network, wherein that method comprising:

receiving one or more data packets comprising operational instructions from an application;

establishing a pipeline element for carrying out a service process, wherein the pipeline element comprises a plurality of sub-pipelines, each associated with a respective task or a part thereof, required for carrying out that service process;

providing a plurality of processing elements, operative to carry out one or more tasks associated with a respective sub-pipeline belonging to the plurality of sub-pipelines included in that pipeline element;

executing simultaneously by the plurality of processing elements, tasks that are associated with the plurality of sub-pipelines, wherein the plurality of selected processing elements is implementing a parallel processing of each data packet, for carrying out the service process.

In accordance with still another aspect of the present disclosure, there is provided a computer program product encoding a computer program stored on a non-transitory computer-readable medium for executing a set of instructions by one or more computer processors for carrying out the method for performing a parallel computing of data packets received in a communication network, wherein the method comprising:

receiving one or more data packets comprising operational instructions from an application;

establishing a pipeline element for carrying out a service process, wherein the pipeline element comprises a plurality of sub-pipelines, each associated with a respective task or a part thereof, required in carrying out the service process;

providing a plurality of processing elements, operative to carry out one or more tasks associated with a respective sub-pipeline belonging to the plurality of sub-pipelines included in the pipeline element;

simultaneously executing by the plurality of processing elements, tasks that are associated with the plurality of sub-pipelines, wherein the plurality of processing elements is implementing a parallel processing of each data packet, for carrying out the service process.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Figure 1:
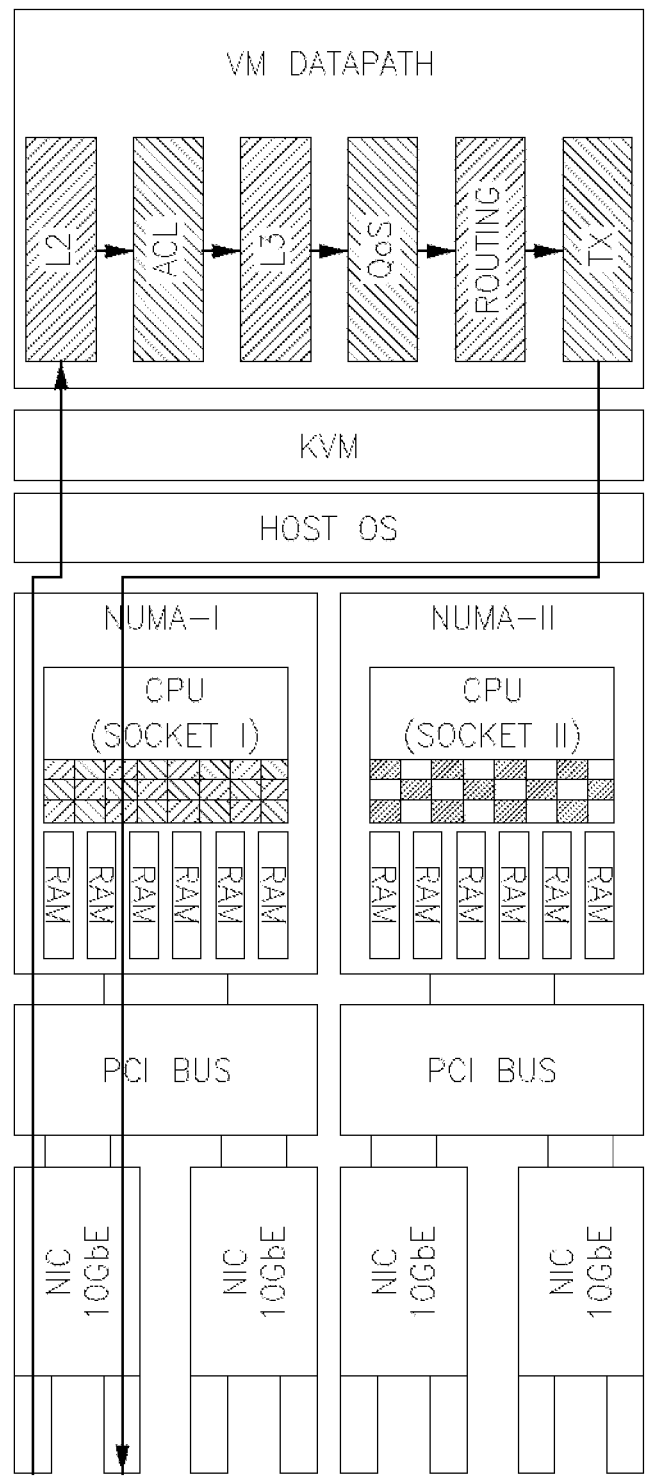
FIG. 1 illustrates a traditional software architecture which is based on the use of a pipeline for carrying out a single service per a physical processing device ("core")
Figure 2:
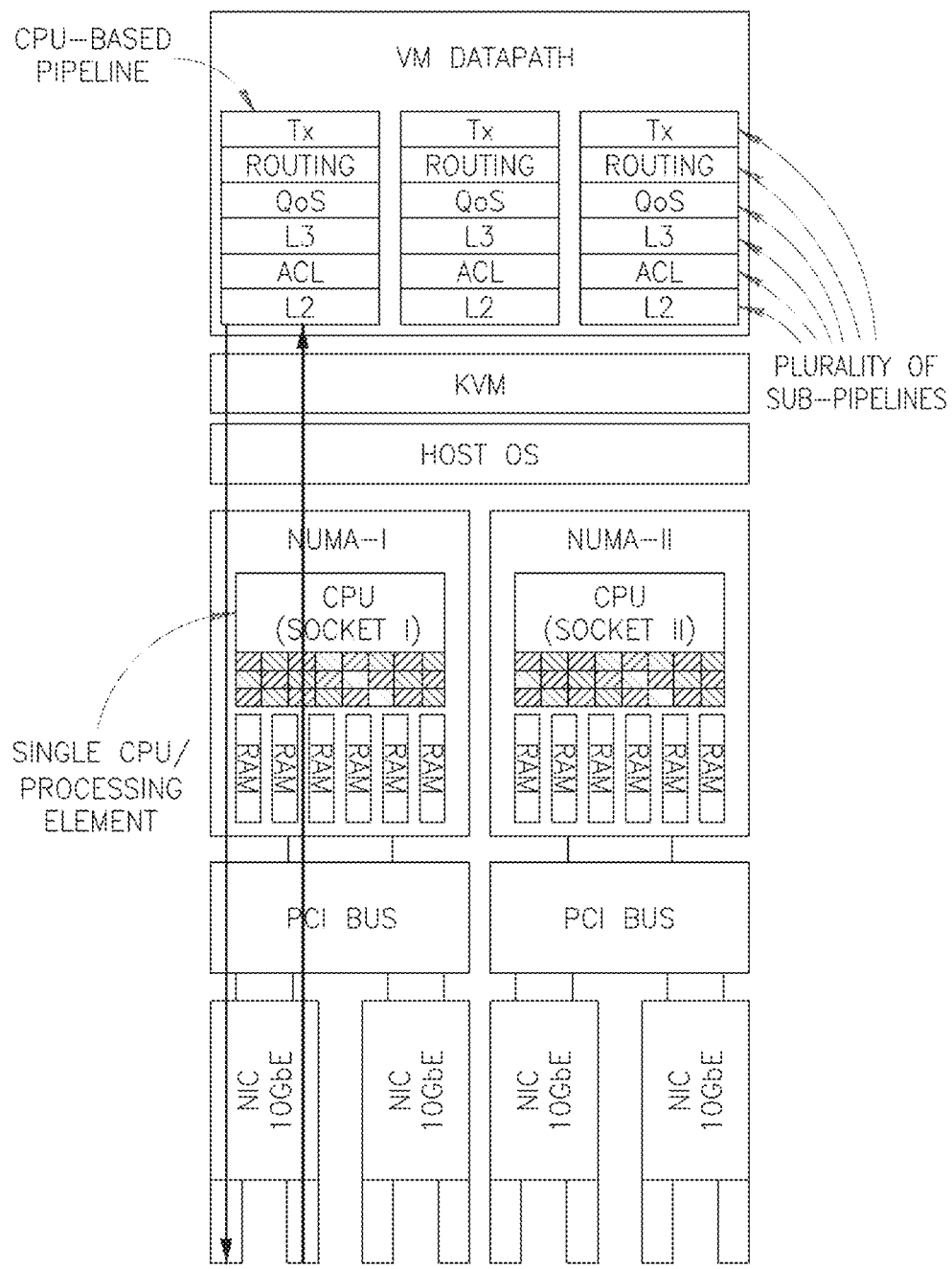
FIG. 2 demonstrates a parallel-processing computer system construed in accordance with an embodiment of the present disclosure.

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

The term "parallel-processing computer system" as used herein, is used to denote a computing system that is capable of simultaneously performing multiple operations. A parallel-processing computer system may contain one or more processing elements including, but not limited to, processors and coprocessors, which may be deployed on a single computer or a plurality of computers linked (wired and/or wireless) by a network in a cluster or grid or other types of configuration. In some embodiments, a processing element includes one or more cores, which may share at least a portion of the same instruction set or use completely different instruction sets. The cores within a processing element may share at least a portion of a common memory space and/or have their own memory spaces. Mechanisms used to implement parallel execution of the operations include, but are not limited to, multiple-instruction-multiple-data (MIMD) execution of multiple instruction sequences, single-instruction-multiple-data (SIMD) execution of a single instruction sequence, vector processing, pipelining, hardware multi-threading, very-long-instruction-word (VLIW) or explicitly-parallel-instruction-computing (EPIC) instructions, superscalar execution, and a combination of at least two of the aforementioned mechanisms. The parallel-processing computer system as a whole may use a single system image, multiple system images, or have no underlying operating system. The parallel-processing computer system also includes memory, or alternatively one or more storage devices (e.g., one or more nonvolatile storage devices) within the memory, including a non-transitory computer readable storage medium. In some embodiments, the memory or the non-transitory computer readable storage medium of the memory stores programs, modules and data structures in accordance with those described in the present disclosure.

In some embodiments, a processing element or a core within a processing element may or may not run an operating system or a virtual machine monitor (e.g., hypervisor) that manages one or more operating systems running on a computer system at the same time.

In some embodiments, a processing element may be a thread running on a physical processor or a virtual machine such as application-level threads, kernel threads, or hardware threads. In some other embodiments, a processing element may be a virtual machine running inside a hypervisor. In other embodiments, a processing element may be a functional unit within a physical processor or a virtual machine.

Traditional software architecture as can be seen in FIG. 1, is an architecture that is based on the use of a pipeline for carrying out a single service per a physical processing device ("core"). Consequently, the use of such an architecture leads to:

1) Software locks (due to the fact that one process awaits resources or information which are currently in use by another process);
2) Performance degradation when implementing service chains; and
3) Large amounts of CPU resources (cores, memory, I/O) are required.

In contradistinction, the solution provided by the present disclosure, relies on performing processing tasks while making use of only one single pipeline, thereby reducing software queues while maintaining software locks at a minimum level for all services. This solution enables achieving improved performance of a service chain per a CPU core.

Contrary to prior art solutions, the solution proposed by the present invention does not require copying packets and having them replaced in the memory. According to the present solution, every process requiring an access to a packet (its header and/or its payload) would be allowed to access the very same copy of the packet as other processes requiring an access to that packet. Therefore, the present solution offers a number of advantages, among which:

1) Less memory transactions are carried out (consequently: lower power requirements, faster processing and less memory is required);
2) Processes can access the very same packet in parallel without having to wait for another process to complete processing that packet;
3) I/O requirements of the processor are reduced to a single transaction; and
4) Service chaining is implemented natively without the need to cycle the packet back and forth.

One of the underlying principles of the proposed solution is that a service chain is built by chaining functions, rather than by passing packets via software queues when running on the same core.

This method reduces the overhead associated with writing and polling the queues while maintaining a clean, well-defined division of responsibilities between the various system components.

Each pipeline element is constructed to carrying out a service process and comprises a plurality of sub-pipelines. The tasks associated with all sub-pipelines that belong to that plurality of sub-pipelines, are carried out at the same CPU, and optionally, passing packets between the plurality of sub-pipelines is performed by calling the in-function of the next sub-pipeline.

Alternatively, a task allocated to a pipeline element (or to each one of a number of the pipeline elements) may be divided so that it is carried out by a number of CPUs, thereby, by running the process in such a hybrid fashion, a more efficient use of network resources may be achieved, and the processing architecture maintains its required flexibility.

When tasks which the CPU is required to perform are intensive tasks (or when certain packets require less real-time resources to be processed), they may be diverted to a different CPU, using software queues, while the majority of packets will still run-to-completion by using a pipeline element as described hereinabove. Such a hybrid mode, enables running management threads on a different CPU, as these threads are typically associated with CPU intensive tasks.

According to an embodiment of the present invention, there is provided a multiple updater lockless timer mechanism. The mechanism for lockless timers according to this embodiment, enables updating timers by applying information received from multiple threads yet without being subjected to locks. A single manager may allow a flow of objects between queues in accordance with their timers, while multiple threads may update the objects' last accessed times.

Upon emerging from a timer queue, the respective object is moved to the queue which is closest to its expiration timeout, when compared with other queues. If the timer is equal to 0, then the object will be discarded.

Each object is provided with access times, determined according to a number of its associated writers (i.e. means of writing data to a buffer) that would allow lockless access, as well as according to the time at which it entered the queue, thereby enabling a relevant managing entity to determine if that object should be removed from the queue to which it was entered.

By following the above method, an efficient management of the timers may be achieved while using a minimal number of queues. For example, 16 queues allow 1 sec resolution timers of up to 18 hours.

In case where a single writer (e.g. for writing data in a lookup table) is used together with a plurality of readers (means of reading data from the respective buffer, e.g. the lookup table), this combination would allow a single managing entity to update data elements in a respective lookup table and also, would allow reading the updated lookup table for a plurality of real-time threads. Therefore, by implementing this embodiment, the memory footprint us reduced considerably.

In a case where multiple readers are not implemented, a lookup table copy should be accessible to each thread, so that if one were to use an x number of cores, this will mean x times the lookup table. If we consider a typical lookup table size to be ±4G, then in a 20 cores system, this will translate into 4*20=80G instead of 4G.

Figure 3:
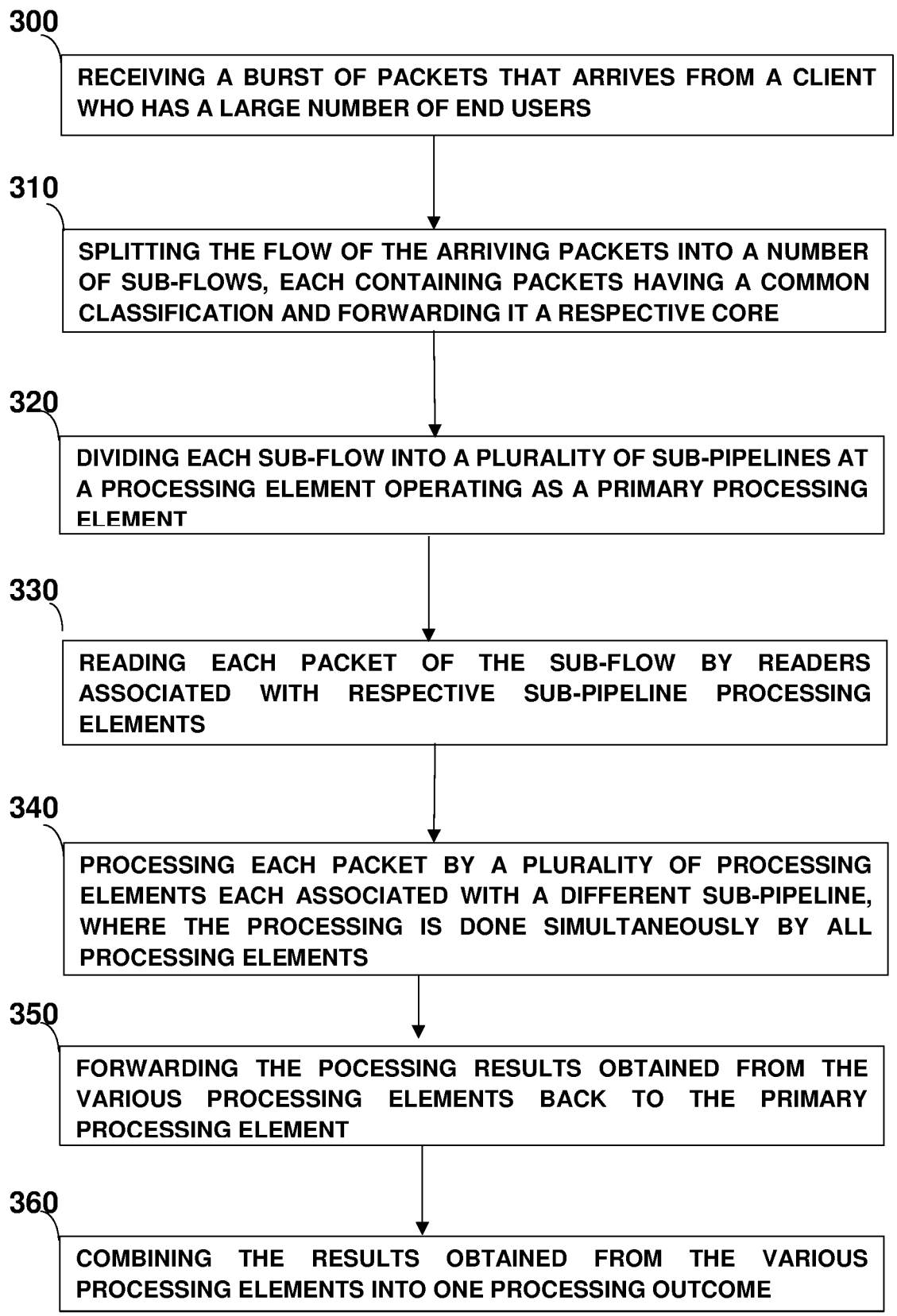
FIG. 3 presents a flow chart, illustrating a method of carrying out an embodiment of the present invention.

FIG. 3 presents a flow chart of an example demonstrating a method construed in accordance with an embodiment of the present invention. Let us assume first that a burst of packets arrives from a client (step 300) who is a company having a large number of end users. This burst of packets arrives for processing to a network entity such as a network card, and the service process required is routing of communication packets. The flow of these arriving packets is then split and divided to a number of sub-flows, each containing packets having all a common classification (direction-wise) and forwarded to a respective core (processor) (step 310). This step, 310, is carried out according to the present example by splitting the packets according to the 5-tuple values associated with each of the received packets. The term "5-tuple" refers to a set of five different values that comprise a Transmission Control Protocol/Internet Protocol (TCP/IP) connection. It includes a source IP address/port number, destination IP address/port number and the protocol in use.

Now, let us further assume that the service to which the present example relates is a routing service. Each of the sub-flows (being a pipeline element) reaches a respective processing element where it is divided into a plurality of sub-pipelines (e.g. micro pipelines) (step 320). Each packet of the sub-flow is read by the readers associated with respective sub-pipeline processing elements (step 330) so that all of the processing elements associated with the different sub-pipelines process in parallel the very same packet (step 340). Examples of sub-piles that may be used in a case such as the one demonstrated in this example, are: a Longest Prefix Match (LPM), L4 processing, L3 inspection, L2 mux, and the like. If further services should be associated with this arriving burst of packets, e.g. a NAT service, it may be defined as an additional sub-pipeline and be carried out by a further processing element.

Once the various processing elements have completed their respective tasks, their results are forwarded back to a processing element (step 350) such as the network card, where they are combined (step 360) into one processing outcome and conveyed therefrom.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A parallel-processing computer system for parallel processing of data packets conveyed in a communication network, comprising:
   a memory;
   a plurality of processing elements; and
   at least one program stored at the memory and configured to be executed by the plurality of processing elements, and wherein the at least one program comprises instructions for:
   at run-time, while an application is being executed,
      receiving one or more data packets comprising operational instructions from the application;
      establishing a CPU-based pipeline element for carrying out a service process, wherein said service process is carried out by chaining functions executed by a same processing element, and wherein said CPU-based pipeline element comprises a plurality of sub-pipelines, each associated with a respective task or a part thereof required for carrying out said service process, wherein each of the plurality of processing elements is operative to carry out one or more tasks associated with a respective sub-pipeline belonging to the plurality of sub-pipelines included in said CPU-based pipeline element, and wherein the one or more tasks associated with all sub-pipelines that belong to that plurality of sub-pipelines, are carried out by a single CPU;
      executing simultaneously by the plurality of processing elements, tasks that are associated with the plurality of sub-pipelines, wherein said plurality of processing elements is implementing a parallel processing of each data packet, for carrying out the service process, and
      wherein said parallel-processing computer system, further comprising a processor configured to determine a flow of objects between queues in accordance with their timers, while a plurality of threads is used to update the objects' last accessed times.

2. The parallel-processing computer system of claim 1, wherein said processor is configured to divert an object emerging from a timer queue, to a queue which is closest to its expiration timeout.

3. The parallel-processing computer system of claim 1, wherein each object is provided with access times, determined according to: a) number of its associated data writing means that would allow lockless access, and b) according to a time at which it has entered a queue,
   thereby enabling said processor to determine which one or more objects should be removed from their respective queues.

4. The parallel-processing computer system of claim 3, comprising a single data writer and a plurality of data readers, configured to enable a single managing entity to update data elements in a respective lookup table, and to read that updated lookup table for a plurality of real-time threads.

\* \* \* \* \*